(12) United States Patent
Brueggemann et al.

(10) Patent No.: US 9,150,198 B2
(45) Date of Patent: Oct. 6, 2015

(54) METHOD FOR BRAKING A MOTOR VEHICLE IN CRITICAL DRIVING SITUATIONS

(75) Inventors: Rainer Brueggemann, Ludwigsburg (DE); Andreas Reize, Adelsheim (DE); Phillipp Frueh, Clayton (AU)

(73) Assignee: ROBERT BOSCH GMBH, Stuttgart (DE)

( * ) Notice: Subject to any disclaimer, the term of this patent is extended or adjusted under 35 U.S.C. 154(b) by 1010 days.

(21) Appl. No.: 13/089,729

(22) Filed: Apr. 19, 2011

(65) Prior Publication Data

US 2011/0257859 A1 Oct. 20, 2011

(30) Foreign Application Priority Data

Apr. 20, 2010 (DE) .......................... 10 2010 027 985

(51) Int. Cl.
| | | |
|---|---|---|
| G06F 7/70 | (2006.01) | |
| G06F 19/00 | (2011.01) | |
| B60T 7/12 | (2006.01) | |
| B60W 10/184 | (2012.01) | |
| B60W 10/18 | (2012.01) | |
| B60T 8/1755 | (2006.01) | |
| B60T 8/172 | (2006.01) | |

(52) U.S. Cl.
CPC . *B60T 7/12* (2013.01); *B60T 8/172* (2013.01); *B60T 8/1755* (2013.01); *B60T 8/17554* (2013.01); *B60W 10/18* (2013.01); *B60W 10/184* (2013.01); *B60T 2230/03* (2013.01)

(58) Field of Classification Search
USPC ............ 701/70, 38, 498, 41, 83, 78–79; 340/936, 440; 73/1.75; 477/120, 115, 477/194

See application file for complete search history.

(56) References Cited

U.S. PATENT DOCUMENTS

| | | | | |
|---|---|---|---|---|
| 5,655,819 | A * | 8/1997 | Emig et al. ............ | 303/116.1 |
| 6,178,368 | B1 * | 1/2001 | Otake .................... | 701/70 |
| 6,179,073 | B1 * | 1/2001 | Chhabra et al. ....... | 180/9.1 |
| 6,179,093 | B1 * | 1/2001 | Daugherty, Jr. ...... | 188/33 |
| 6,186,602 | B1 * | 2/2001 | Jonner et al. ......... | 303/115.4 |
| 6,761,418 | B2 * | 7/2004 | Nakamura et al. ... | 303/113.1 |

(Continued)

FOREIGN PATENT DOCUMENTS

| CN | 201613891 U | * | 10/2010 |
|---|---|---|---|
| JP | 10-219225 | * | 8/1998 |

(Continued)

OTHER PUBLICATIONS

Skid control of small electric vehicle (Effect of the regenerative braking force to the hysteresis of friction brake force); Peeie, M.H. ; Ogino, H. ; Oshinoya, Y.; Systems, Process & Control (ICSPC), 2013 IEEE Conference on; DOI: 10.1109/SPC.2013.6735101; Publication Year: 2013 , pp. 46-51.*

(Continued)

*Primary Examiner* — Cuong H Nguyen
(74) *Attorney, Agent, or Firm* — Kenyon & Kenyon LLP

(57) ABSTRACT

A method for braking a motor vehicle in critical driving situations in which the risk exists that the transverse forces acting on the vehicle will become so great in the continued progression of its movement that it rolls over laterally. In order to reduce the risk of a lateral rollover, the vehicle operation is monitored with regard to such critical driving situations and a parking brake is activated automatically if a critical driving situation is detected.

13 Claims, 2 Drawing Sheets

(56) References Cited

U.S. PATENT DOCUMENTS

| | | | |
|---|---|---|---|
| 6,860,569 B1* | 3/2005 | Campau et al. | 303/11 |
| 7,031,818 B2* | 4/2006 | Endres | 701/70 |
| 8,239,107 B2* | 8/2012 | Mair | 701/67 |
| 8,315,765 B2* | 11/2012 | Gerdes et al. | 701/41 |
| 8,322,473 B2* | 12/2012 | Hilberer | 180/65.265 |
| 8,500,220 B2* | 8/2013 | Einig et al. | 303/148 |
| 2004/0119333 A1* | 6/2004 | Hackl | 303/125 |
| 2005/0222744 A1* | 10/2005 | Sakata | 701/70 |
| 2006/0052917 A1* | 3/2006 | Schwarzhaupt et al. | 701/29 |
| 2008/0048492 A1* | 2/2008 | Sakai | 303/113.1 |
| 2010/0191423 A1* | 7/2010 | Koyama et al. | 701/42 |
| 2011/0264347 A1* | 10/2011 | Cetinkaya | 701/70 |

FOREIGN PATENT DOCUMENTS

| | | | |
|---|---|---|---|
| JP | 11-370507 | * | 12/1999 |
| WO | PCT/EP02/07656 | * | 7/2002 |

OTHER PUBLICATIONS

Study on Braking Stability of Electro-mechanical Hybrid Braking System in Electric Vehicles Based on ECE Regulation; Ji Fenzhu ; Liu Lijun; Computer Distributed Control and Intelligent Environmental Monitoring (CDCIEM), 2011 International Conference on DOI: 10.1109/CDCIEM.2011.186; Publication Year: 2011 , pp. 1358-1362.*

An optimization technique of braking force distribution coefficient for truck; Zhao Luhua ; Cao Qinggui ; Li Yushan ; Gao Naixiu Transportation, Mechanical, and Electrical Engineering (TMEE), 2011 International Conference on; DOI: 10.1109/TMEE.2011.6199559; Publication Year: 2011 , pp. 1784-1787.*

The system integration of unmanned vehicle and driving simulator with sensor fusion system; Duk-Sun Yun ; Jae-Heung Shim ; Min-Seok Kim ; Young-Hoon Park ; Jung-Ha Kim; Multisensor Fusion and Integration for Intelligent Systems, 2001. MFI 2001. International Conference on; DOI: 10.1109/MFI.2001.1013518; Publication Year: 2001 , pp. 115-120.*

Emergency driving support algorithm with steering torque overlay and differential braking; Jaewoong Choi ; Kyuwon Kim ; Kyongsu Yi; Intelligent Transportation Systems (ITSC), 2011 14th International IEEE Conference on; DOI: 10.1109/ITSC.2011.6083120 Publication Year: 2011 , pp. 1433-1439.*

Experimental study on vehicle speed estimation using accelerometer and wheel speed measurements; Li-jun Wu; Mechanic Automation and Control Engineering (MACE), 2011 Second International Conference on; DOI: 10.1109/MACE.2011.5986916 Publication Year: 2011 , pp. 294-297.*

Design and control of Unmanned Ground Vehicle using SUV; Jae-Hoon Jang ; Myung-Wook Park ; Jeong-yeob Lee ; Ji-suk Lee; ICCAS-SICE, 2009; Publication Year: 2009 , pp. 2417-2420.*

Integrated control for vehicle lateral dynamics improvements using second order sliding mode; Bardawil, C. ; Talj, R. ; Francis, C. ; Charara, A. ; Doumiati, M.; Control Applications (CCA), 2014 IEEE Conference on; DOI: 10.1109/CCA.2014.6981366 Publication Year: 2014 , pp. 322-327.*

Nonlinear steering and braking control for vehicle rollover avoidance; Odenthal, Dirk ; Bunte, Tilman ; Ackermann, Jurgen; Control Conference (ECC), 1999 European; Publication Year: 1999 , pp. 598-603.*

Research of steering angle compensation by driving speed of unmanned ground vehicle; Yeun-ki Jo ; Myung-Wook Park ; Seung-Ho Bae ; Jung-Ha Kim; Control, Automation and Systems (ICCAS), 2011 11th International Conference on; Publication Year: 2011 , pp. 738-741.*

* cited by examiner

METHOD FOR BRAKING A MOTOR VEHICLE IN CRITICAL DRIVING SITUATIONS

FIELD OF THE INVENTION

The present invention relates to a method for braking a motor vehicle in critical driving situations in which the risk exists that the transverse forces acting on the vehicle will become so great in the continued progression of a driving maneuver that the vehicle rolls over laterally.

BACKGROUND INFORMATION

A risk of lateral rollover exists in particular in vehicles having a high center of gravity, for example, vans or small trucks in which the transverse forces acting on the vehicle become critical even at low speeds. For that reason, the driver must decelerate the vehicle in good time in curves or steering maneuvers to limit the vehicle's transverse acceleration. The higher the vehicle's center of gravity, the sooner must the speed be reduced. If the driver brakes too late, a vehicle dynamics controller, such as ESP, usually intervenes in the vehicle operation, braking the vehicle automatically. In the case of very heavy vehicles having high-volume brake systems, however, the increase in braking force generated by the vehicle dynamics controller may be too small to decelerate the vehicle to the adequate extent. For that reason, the risk continues to exist that the vehicle will roll over.

SUMMARY OF THE INVENTION

An object of the present invention is therefore to provide a method and a device which may be used to reduce the risk of lateral rollover to a greater extent.

The present invention describes a method for monitoring the operation of a vehicle with regard to critical driving situations in which the risk exists that the transverse forces acting on the vehicle will become so great in the continued progression of the vehicle's movement that it rolls over laterally. As soon as such a driving situation is detected, a parking brake is activated automatically, which, in addition to the service brake, such as a hydraulic or pneumatic brake, decelerates the vehicle. As a result, the vehicle is decelerated at an overall faster rate, thus reducing the transverse forces acting on the vehicle.

According to the present invention, the risk of rollover is preferably estimated using one or multiple state variables. The monitored state variables may include a steering angle, a transverse acceleration, a yaw rate and/or wheel speeds or the change over time of at least one of the named variables. Appropriate sensors which are adequately known from the related art are provided for measuring the individual variables. According to the present invention, a risk of rollover is, for example, assumed if a predefined condition is met, for example, if the presently measured transverse acceleration and the gradient of the yaw rate exceed predefined threshold values. The conditions that must be met for the detection of a "critical driving situation" may be freely defined as a function of application.

As an alternative to the above-described monitoring of the present operating behavior, a future value of a variable describing the vehicle's transverse dynamics, such as a transverse force or the transverse acceleration, may be estimated. The estimation is preferably made based on an assumed future movement behavior of the vehicle. In this case, for example, a "critical driving situation" is detected if the estimated future transverse dynamics variable exceeds a predefined threshold value.

The future value of the transverse dynamics variable is preferably calculated from the yaw rate, the steering angle, a transverse acceleration and/or the wheel speeds or from the change over time of one or multiple of the named variables. The estimation is preferably made under the assumption of a specific braking behavior of the vehicle.

According to a special specific embodiment of the present invention, a braking torque or a variable proportional to it is calculated, such as a braking force which must be exerted on the vehicle's service brake, for example, a hydraulic brake, in order to prevent the vehicle from rolling over laterally in the continued progression of its movement. If the presently available braking torque of the service brake is not adequate, the parking brake is activated automatically. If, however, the service brake reserve is still adequate, the braking torque of the service brake is preferably increased automatically. To this end, for example, a hydraulic pump, a brake booster, or another actuator of the service brake system may be activated accordingly. In this case, the parking brake is not activated.

For the purpose of detecting "critical driving situations" as defined by the present invention, data relating to the roadway, such as, for example, navigation data may also be considered. From these data it may be inferred if the vehicle is being driven on an expressway exit and a tight curve lies in front of the vehicle. This also makes it possible to estimate the vehicle's future transverse dynamics behavior.

DETAILED DESCRIPTION

Figure 1:
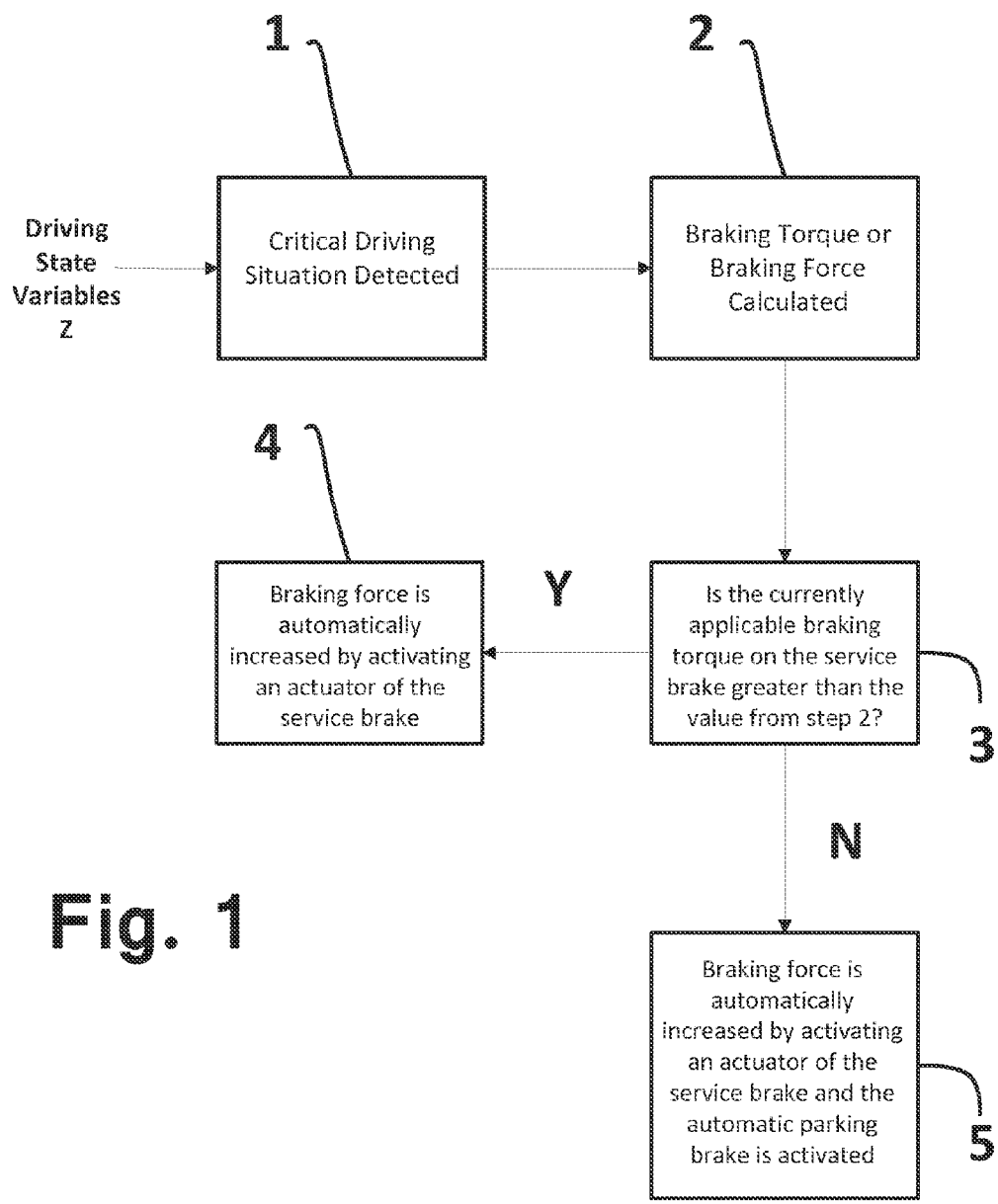
FIG. 1 shows various method steps of a method for braking a motor vehicle in critical driving situations according to a particular specific embodiment of the present invention.

FIG. 1 shows a schematic representation of various method steps of a method for braking a motor vehicle in critical driving situations. In step 1, the vehicle operation is monitored with regard to critical driving situations in which the risk exists that the transverse forces acting on the vehicle will become so great in the continued progression of the vehicle's movement that it rolls over laterally. To detect such "critical driving situations," an algorithm is provided which is stored in a control unit. To this end, the algorithm evaluates various driving state variables Z, such as the steering angle, the transverse acceleration, the yaw rate, the brake pressure and/or the wheel speeds. The named variables are measured by appropriate sensors which are integrated into the vehicle. If one or multiple of the named variables or the change over time of one or multiple of the named variables exceed predefined threshold values, a critical driving situation is detected.

If a critical driving situation is detected in step 1, a braking torque or a braking force is calculated in step 2 which must be exerted on the vehicle's service brake to prevent the forces or transverse accelerations acting on the vehicle in the future from exceeding a predefined threshold value, resulting in the risk that the vehicle will roll over laterally.

In step 3 it is checked if the currently applicable braking torque on the service brake is greater than the necessary braking torque ascertained in step 2. If yes, the braking force is automatically increased in step 4 by activating an actuator of the service brake. If no, the braking force of the service brake is automatically increased in step 5 and the automatic parking brake is activated in addition. This causes the vehicle to be decelerated at an overall faster rate, resulting in a reduction of the risk of lateral rollover.

Figure 2:
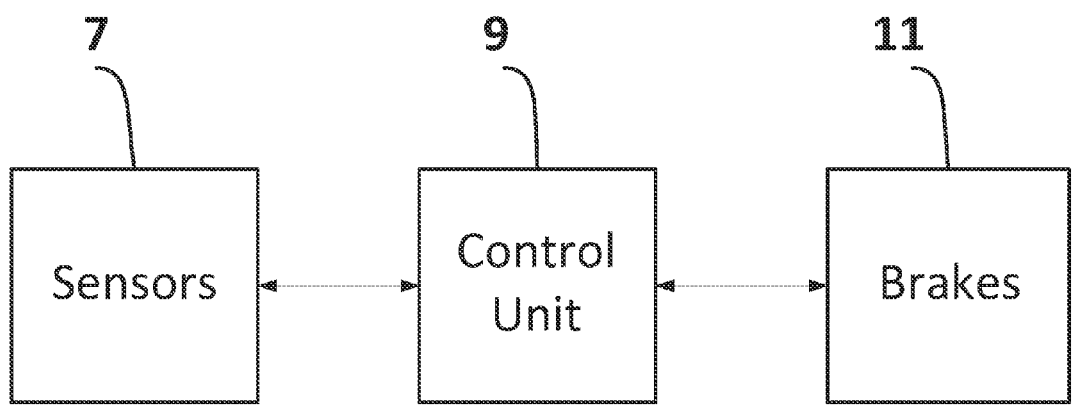
FIG. 2 shows structural components that perform the steps of the method shown in FIG. 1, according to an example embodiment of the present invention.

FIG. 2 shows the interconnections between sensors 7, control unit 9, and brakes 11. Brakes 11 include the service brake and automatic parking brake. Sensors 7, control unit 9, and brakes 11 perform the method of FIG. 1.

What is claimed is:

1. A computer-implemented method for automatically braking a moving motor vehicle, the method comprising:
    monitoring, by a computer processor, a state variable that indicates an operation of thevehicle while the vehicle is in motion;
    comparing a characteristic of the monitored state variable to a predefined threshold value;
    detecting, by the processor and based on the comparison, a risk of transverse forces acting on the vehicle causing the vehicle to laterally roll over with a continued progression of the vehicle's movement; and
    responsive to the risk, automatically activating, by the processor, a parking brake of the moving vehicle.

2. The method according to claim 1, wherein the risk is detected responsive to at least one of: the monitored state variable meeting the predefined threshold value and a change over time of the monitored state variable meeting the predefined threshold value.

3. The method according to claim 2, wherein the monitored state variable includes least one of the following variables: steering angle, transverse acceleration, yaw rate, and wheel speeds.

4. The method according to claim 1, wherein the risk is detected responsive to an estimated future value of the monitored state variable describing transverse dynamics of the vehicle exceeding the predefined threshold value.

5. The method according to claim 4, wherein the estimated variable is ascertained under the assumption of a specific movement or braking behavior of the vehicle.

6. The method according to claim 4, wherein the estimated variable is a transverse force or a transverse acceleration.

7. The method according to claim 4, wherein the estimated future value is ascertained by considering at least one of the following variables: a yaw rate, a steering angle, an instantaneous transverse acceleration, and a wheel speed.

8. The method according to claim 1, further comprising:
    calculating, by the processor, a braking force or a braking torque which must be exerted to prevent the vehicle from rolling over laterally in the continued progression of its movement, wherein the automatic activation of the parking brake is performed in accordance with the calculated required braking force or braking torque.

9. A computer-implemented method for automatically braking a motor vehicle, the method comprising:
    monitoring, by a computer processor, an operation of the vehicle;
    based on the monitoring, calculating by the processor a braking force or a braking torque to be exerted to prevent the vehicle from rolling over laterally with continued progression of movement of the vehicle;
    performing a comparison, by the processor, to determine whether the calculated braking force or braking torque is greater than a braking force or braking torque currently available from a service brake; and
    performing, by the processor, a process according to which (a) the processor automatically activates the parking brake conditional upon that the calculated braking force or braking torque is greater than the braking force or braking torque currently available from the service brake, and (b) the braking force or braking torque of the service brake is increased automatically without activating the parking brake if the calculated braking force or braking torque is not greater than the braking force or braking torque available from the service brake.

10. The method according to claim 9, wherein if the parking brake is activated, the braking torque of the service brake is also simultaneously automatically increased.

11. A control unit for automatically braking a moving motor vehicle, the control unit comprising:
    a computer processor configured to:
        monitor a state variable that indicates an operation of the vehicle while the vehicle is in motion;
        compare a characteristic of the monitored state variable to a predefined threshold value;
        detect, based on the comparison, a risk of transverse forces acting on the vehicle causing the vehicle to laterally roll over with a continued progression of the vehicle's movement; and
        responsive to the detected risk, automatically activate a parking brake of the moving vehicle.

12. The method according to claim 3, wherein the detection of the risk is based additionally on data concerning a roadway on which the vehicle is moving.

13. The method according to claim 7, wherein the estimated future value is ascertained by further considering data relating to a roadway on which the vehicle is moving.

* * * * *